US012504390B2

(12) United States Patent
Höhler et al.

(10) Patent No.: US 12,504,390 B2
(45) Date of Patent: Dec. 23, 2025

(54) HOLDER FOR AND X-RAY PROTECTION ELEMENT

(71) Applicant: Wipotec GmbH, Kaiserslautern (DE)

(72) Inventors: Hans-Sebastian Höhler, Hildesheim (DE); Bernd Zinke, Mandelbachtal (DE)

(73) Assignee: Wipotec GmbH, Kaiserslautern (DE)

( * ) Notice: Subject to any disclaimer, the term of this patent is extended or adjusted under 35 U.S.C. 154(b) by 590 days.

(21) Appl. No.: 17/795,205

(22) PCT Filed: Jan. 27, 2021

(86) PCT No.: PCT/DE2021/100081
§ 371 (c)(1),
(2) Date: Feb. 13, 2023

(87) PCT Pub. No.: WO2021/151434
PCT Pub. Date: Aug. 5, 2021

(65) Prior Publication Data
US 2023/0160842 A1 May 25, 2023

(30) Foreign Application Priority Data
Jan. 28, 2020 (DE) .......................... 102020102000.7

(51) Int. Cl.
*G01N 23/18* (2018.01)
*G01N 23/083* (2018.01)
*G01N 33/02* (2006.01)
(52) U.S. Cl.
CPC ........... *G01N 23/18* (2013.01); *G01N 23/083* (2013.01); *G01N 33/02* (2013.01); *G01N 2223/1016* (2013.01); *G01N 2223/30* (2013.01); *G01N 2223/306* (2013.01); *G01N 2223/618* (2013.01);
(Continued)

(58) Field of Classification Search
None
See application file for complete search history.

(56) References Cited

U.S. PATENT DOCUMENTS

| 7,711,091 B2* | 5/2010 | Sasaki | G01N 23/207 378/115 |
| 9,014,331 B2* | 4/2015 | Crass | G01N 23/04 378/57 |
| 9,618,461 B2* | 4/2017 | Ohara | G01T 7/00 |

(Continued)

FOREIGN PATENT DOCUMENTS

| CN | 203287335 U | 6/2013 |
| GB | 2370634 A | 7/2002 |

(Continued)

OTHER PUBLICATIONS

DE 10 2020 102 000.7 German Office action dated Aug. 24, 2020.
(Continued)

*Primary Examiner* — Thomas R Artman
(74) *Attorney, Agent, or Firm* — Calvert Technology Law, PLLC; Nathan H. Calvert

(57) ABSTRACT

An X-ray inspection apparatus includes a holder for arranging a protective element in the X-ray inspection apparatus. The holder includes a plurality of receiving structures arranged one behind the other in a conveying direction, in order to be able to easily insert or remove the protective element at different positions along the conveying direction.

20 Claims, 4 Drawing Sheets

(52) U.S. Cl.
 CPC . *G01N 2223/643* (2013.01); *G01N 2223/652* (2013.01)

(56) References Cited

U.S. PATENT DOCUMENTS

| | | | |
|---|---|---|---|
| 10,790,067 B2* | 9/2020 | Omori | G01N 23/18 |
| 2008/0056452 A1* | 3/2008 | Sasaki | G01N 23/207 378/204 |
| 2011/0058650 A1 | 3/2011 | Makino | |
| 2013/0114788 A1 | 5/2013 | Crass | |
| 2014/0105368 A1* | 4/2014 | Ohara | G01N 23/20008 378/204 |
| 2015/0338355 A1 | 11/2015 | Kim | |
| 2016/0372223 A1 | 12/2016 | Splinter | |
| 2018/0122526 A1 | 5/2018 | Omori | |
| 2023/0160842 A1* | 5/2023 | Höhler | G01N 23/083 378/62 |

FOREIGN PATENT DOCUMENTS

| | | | |
|---|---|---|---|
| JP | H 11-160487 A | 6/1999 | |
| JP | 2000039406 A | 2/2000 | |
| JP | 2003156456 A * | 5/2003 | |
| JP | 2003270174 A | 9/2003 | |
| JP | 2005172485 A | 6/2005 | |
| JP | 2005308413 A | 11/2005 | |
| JP | 2006343187 A | 12/2006 | |
| JP | 2014-077714 A | 5/2014 | |
| JP | 2018-077208 A | 5/2018 | |
| JP | 2019-020298 A | 2/2019 | |
| WO | 2017061594 A1 | 4/2017 | |

OTHER PUBLICATIONS

PCT/DE2021/100081 International Search Report dated Jun. 21, 2021.

MirageC: "319mm/s on HevORT—CoreXY MGN rail—Testing Dynamic Acceleration with Duet3D M593 command." Youtube, December 10m 2019 (https://youtu.be/WeOYV0WSxMQ) Apr. 14, 2021.

Chinese patent application No. 202180022138.X Chinese Patent Office action dated Sep. 12, 2024.

Japanese Patent Office Action issued Aug. 2, 2023 in application JP 2022-544795.

* cited by examiner

HOLDER FOR AND X-RAY PROTECTION ELEMENT

TECHNICAL FIELD OF THE INVENTION

The present invention relates to X-ray inspection apparatuses and methods, particularly those using a holder for X-ray protection elements.

BACKGROUND OF THE INVENTION

Industrially manufactured goods, especially foodstuffs, are often X-rayed by means of an X-ray inspection device (hereinafter referred to as "X-ray machine") in order to check the proper condition or to detect possible foreign bodies. In most cases, the products are manufactured or processed in various successive process stages, for which they are moved along a conveyor path through the production plant to the individual machines. The conveyor path also leads through a suitable X-ray machine.

During X-ray inspection, care must be taken to ensure that the X-rays from the X-ray unit are confined to a defined X-ray inspection area and cannot escape unintentionally into the system environment. Therefore, protective elements are provided along the conveyor path at the entrance and exit of the inspection area, which block or absorb the X-ray radiation. These protective elements can be curtains known to the skilled person, which hang down onto the conveyor path. These can be formed in the manner of a link chain of radiation-absorbing elements (e.g., plates containing lead) suspended from one another. Alternatively or additionally, radiation-absorbing lamellas arranged side by side or combinations of the two solutions are also conceivable. Such a curtain forms an essentially closed and thus radiation-tight boundary of the interior of the X-ray enclosure when it is completely suspended down to the conveyor path. A product to be conveyed into or out of the device then pushes aside some elements of the protective element along its conveyor path until it has left the curtain completely behind, so that the curtain takes on its closed form again.

Protective elements are also known which essentially consist of a rigid plate and have a passage opening. The plate is suspended vertically so that it extends down to just above the conveyor plane or belt on which the products are conveyed through the X-ray machine. The passage opening is located in the conveying path in such a way that a product to be inspected can pass through the opening into or out of the inspection space with as little play as possible. The plate thus limits the inspection space upstream or downstream and leaves only the passage opening itself free, which then has to be protected against radiation leakage by separate means. Protective elements without such openings are also known, which are then positioned sufficiently high above the conveyor belt to allow a product to pass underneath. Complete radiation protection is then ensured by additional protective elements and/or by suitably selected conveyor paths within the inspection area.

Different dimensions of the products to be inspected make it necessary to use different protective elements, usually also at different positions. In particular, the length of the product considered in the conveying direction X has an influence on the position at which the curtains are to be arranged at the entrance and exit of the X-ray unit. Longer products require a correspondingly larger inspection space in order to be completely accommodated or irradiated without part of the product protruding through a curtain at the entrance or exit of the device. Accordingly, the protective elements must have a greater distance to each other in the conveying direction X, which also depends on the X-position within the inspection space at which the X-ray fan that shines through the product is positioned.

The products of different production series usually have to be processed at different conveyor speeds and varying distances in the conveying direction. Also, different products often differ with regard to their weight, their length in conveying direction X, their width in a transverse direction Y perpendicular to conveying direction X or their height in a vertical direction Z perpendicular to directions X and Y, whereby in each case a special protective element tailored to the respective product and its characteristics must be provided at a specific X-position along the conveying path on the X-ray unit. In practice known to date, the X-ray units are delivered with protective elements pre-installed in terms of number and position, and their adaptation to different products after delivery in the field is time-consuming and expensive. The selection and positioning of suitable protective elements for each application is not yet satisfactorily solved in the state of the art and is often associated with high mechanical effort, which limits product throughput and increases personnel costs. For a configuration of the X-ray unit that is changed in the field, for example when switching to a new product group with differently positioned or different protective elements, the system must be approved again by a radiation protection officer.

SUMMARY OF THE INVENTION

The problem addressed by the invention is that of simplifying the exchange and positioning of protective elements of the aforementioned type and the simplified recommissioning of an X-ray machine after a configuration change.

X-ray inspection devices and methods according to the present invention provide an arrangement in which protective elements on X-ray machines are particularly easy to replace and position with the aid of a suitable holding device which can be arranged on or in the X-ray machine. The holder comprises at least two holding sections spaced apart in transverse direction to each other. Each of these holding sections is designed according to the invention to receive a connecting section of a protective element in order to be able to temporarily fix the protective element to the holder.

In order to enable the simple arrangement of protective elements also at different X-positions, the holder provides that the holding sections have a plurality of individual receiving means or receiving structures along the longitudinal X-direction. The receiving means can lie one behind the other at irregular, but preferably at regular intervals in the X-direction, whereby they offer a plurality of possible X-positions for the arrangement of a protective element in a plurality of operating positions. Thus, a protective element can be arranged or removed by means of connecting sections formed thereon at an X-position defined by the receiving means and specifically pre-determinable depending on the application to define the operating position of the protective element.

The receiving means or receiving structures according to the invention can be any elements known to the skilled person which enable an operative connection with the connecting sections of the protective element in order to fasten the protective element relative to the holder. A particularly simple receiving means or receiving structure a hole or an upwardly open elongated hole into which a connecting section of a protective element projecting as a pin in the transverse direction Y can be inserted or suspended. Each of the two retaining sections of the holder could, for example, be formed as a perforated metal strip or toothed rail, each of the two strips extending above and to the side of the conveying path in the X direction, so that the protective element can be inserted or hooked between the two strips and extend down towards the conveying path. Hook-like receiving means or receiving structures that engage in suitable recesses of the connecting sections (or vice versa) are also conceivable.

Alternatively or additionally, other receiving means or receiving structure may be used, for example small protrusions in transverse direction Y, which can engage in suitable recesses of the connecting sections of the protective element. Also available for use are magnetic means which provide defined X-positions which provide operating positions along the holding sections for the arrangement of a protective element, whereby connecting sections of the protective element which suitably interact with these magnetic means are to be provided. For example, the receiving means or receiving structures could have magnets or be ferromagnetic, while the connecting sections of a protective element could be correspondingly ferromagnetic or have a magnet. The areas between individual receiving means or receiving structures could be non-magnetic, so that the arrangement of a protective element at such an intermediate position is not possible. The receiving means or receiving structures can also comprise controllable electromagnets so that a magnetic effect is built up temporarily or permanently via a suitable control unit, for example, only at the X-position or operating position at which a protective element is to be inserted. The operator can thus "feel" the correct X-position with the protective element without having to take the information from a display that may be difficult to see at that moment. ("Display" is to be understood here as a display device centrally located on the machine for the visual output of information of any kind, as opposed to special display means at specific X-positions, which only output information on this X-position).

The receiving means or receiving structures may also be implemented as parts of a snap-in connection which form a spring-loaded positive or frictional connection between the receiving means and the connecting sections of an associated protective element. For example, the receiving means could have a bore into which a spring-loaded ball can engage as part of a connecting section of a protective element. The functionally opposite solution, in which the receiving means of the retaining sections comprise spring-loaded latching elements to engage in suitable recesses on the receiving means of a protective element, is also conceivable.

The receiving means or receiving structure can preferably be operated without tools and can be engaged and disengaged with the connecting sections of a protective element. This facilitates and speeds up the replacement or relocation of a protective element. In addition to the simple connections mentioned (hole-pin, slotted hole for suspension, hook, toothed rail, etc.), connection means may also be used in which a manually operated knurled screw or wing nut is used to secure the connection. For example, a connecting section of a protective element could have an external thread extending in transverse direction Y, which projects through a suitable recess of a retaining section and is detachably locked on the opposite side with such a nut. Instead of individually fixing individual receiving sections relative to the associated receiving means, other embodiments may secure several protective elements inserted into the holder simultaneously with a securing mechanism acting over the entire length of the receiving sections or a longer section thereof. For example, connecting sections of the protective elements designed as pins could be inserted from above into receiving means, which are designed, for example, as upwardly open elongated holes. After insertion, a rail formed in the X-direction and pivotable relative to the retaining section on the latter could thus be pivoted about a pivot axis running in the X-direction into a fixing position in which the rail comes to lie above or on the upper side of the pegs of all inserted protective elements. Removal of the protective elements upwards from the slotted holes of the retaining sections is then blocked by the rail. The taking or release of the fixing position by the rail or its actuation can be effected by manually operated, electromechanical, or other means known to the skilled person. For example, a higher-level control system, preferably by evaluating process signals, could cause or block the swivelling of the rail.

Other means by which several protective elements can be simultaneously secured in their inserted position may be used according to the invention, for example a rail that can be manually pushed in in the X direction. Alternatively, suitable securing means can also be provided individually for each individual X-position, or the connection formed there, for example with levers that can be operated manually or automatically, magnetic mechanisms, latching mechanisms, etc.

Preferably, the two holding sections are designed in such a way that the respective receiving means or receiving structures arranged thereon are opposite each other in pairs in transverse direction Y at a common X-position. The receiving means or receiving structures lying one behind the other in the conveying direction X form a grid with discrete X-positions for the arrangement of a protective element at such an X-position. A conceivable grid dimension would be, for example, 0.5 cm to 2 cm. According to some embodiments, a protective element should not be arranged between two X-positions defined by adjacent receiving means or receiving structures.

In a further aspect of the invention, it is also allowable to provide not only one row of receiving means or receiving structures lying one behind the other in the X-direction per holding section. Several such rows, which are provided, for example, lying one above the other in vertical direction Z on the holding sections and have different screenings in the X-direction, extend the positioning possibilities for different applications.

According to an advantageous embodiment of the invention, the holding sections, preferably their receiving means or receiving structures, are provided with a coding at predetermined X-positions that constitute possible operating positions for the protective elements. The coding is intended to assist an operator who is to insert a protective element into or remove it from the holder, in order to be able to quickly identify the relevant protective element or the X-position provided for it. Such coding, also in conjunction with detectors described below, allows easy verification of the correct set-up of the X-ray machine, which can also be stored or archived by suitable memory means.

This coding can be, for example, mechanical structures that enable the insertion of a specific protective element (more precisely: its connecting sections) into specific receiving means or at specific X-positions along the holding sections. In some embodiments of the invention, a mechanical coding blocks the insertion of protective elements that are unsuitable for this X-position. For example, suitable peg profiles (circle, triangle, square, star, etc.) with complementary recesses on the receiving means or connecting sections may be used. By means of specially matched engagement profiles, it is achieved that certain protective elements can only be arranged at certain X-positions, so that faulty placement of the protective elements is more easily avoided. Magnetic means can also be part of such a coding and, for example, favor (connecting section and receiving means attract) or hinder (connecting section and receiving means repel) the insertion of protective elements at certain X-positions by means of suitable magnetic polarity of receiving means and associated connecting sections. Furthermore, the receiving means or receiving structure and the connecting sections cooperating therewith for the insertion of the protective element in the correct position can be designed in such a way that a connecting section can only be inserted into one of the retaining sections of the holder, but not into another (preferably opposite in transverse direction Y) retaining section. This ensures that the protective element can only be inserted in a certain orientation and not rotated by 180°, for example.

Visually detectable features can also be used for coding. The color coding of certain receiving means or their X-position would be employed in some embodiments. For example, the X-position of the receiving means for a protective element, which would have to be arranged at this X-position for a product type $F_1$, could have a red marking. Knowing the type of product to be processed and the color "red" belonging to the product type $F_1$, the operator could easily identify the corresponding X-position and arrange the protective element there. X-positions or receiving means marked with blue, on the other hand, would be unsuitable for processing products of type $F_1$ and would instead be intended for products of type $F_2$. In the same way, letters, numbers or symbols could be used alternatively or additionally for this purpose.

In a particularly preferred variant, the optical coding is attached both to the holder and to a matching protective element. In this case, the assignment is even easier. For example, it would then be easy to see that a protective element marked with a triangle is only to be arranged at the X-position that is also marked with a triangle.

Codes include those that are machine-readable, such as barcodes, QR (quick response) codes and RFID (radio frequency identifier) codes. A code may also include an identifier so that specific physical or other characteristics of the protective element in question can be derived from a particular code, possibly using a database. The coding means may also be repeatedly writable with data.

A further advantageous embodiment of the invention provides illuminating means or illumination elements which are used for the purpose of coding. The illuminating means or illumination elements are designed in such a way that—e.g., according to the specification of a certain product type to be processed—the X-position or the associated receiving means or receiving structure is indicated or illuminated by suitable illuminating means at which the protective element is to be inserted. For example, an LED at the intended X-position could be controlled by a higher-level controller. Furthermore, several illuminants can be arranged at a certain X-position, which, for example, give a message in different colors as to which protective element (preferably marked with the same color) is to be inserted at this position. It is provided in some embodiments, for example, that different protective elements are to be used for different product types, but both at the same X-position.

Of course, the aforementioned codes can also identify several X-positions, for example to identify the position of one protective element at the entrance and one at the exit of the X-ray inspection area.

According to a further advantageous embodiment of the invention, detection means are provided in order to be able to detect—preferably automatically—the type and/or the X-position and/or the coding of a protective element inserted into the holder. In the simplest case, these can be purely mechanical detection means, for example in that certain receiving means can only be combined with certain connection sections. If, for example, a star-shaped connecting section of a protective element is inserted into a complementary recess (receiving means) of the holder, a known connection between the star-shaped connecting section and the associated protective element can be used to infer the type of this protective element. The coding described above can also be understood as detection means in the broadest sense.

Preferably, however, the means of detection comprise suitable sensors that detect an identifier that can be read on the respective protective element and signal it to a higher-level control system (conversely, the protective element could also be equipped with one or more detectors in order to read out a code on the holder and transmit it to a control system). In the simplest case, the detection is limited to whether or not a protective element is arranged at the respective X-position, for example, in order to block the operation of the X-ray unit in the event of incorrect X-positioning.

The means of detection may be designed to detect the type or coding of the protective element inserted at a specific X-position. Suitable sensors for this purpose can, for example, be based on one or more of the following technologies: barcode, QR code, RFID, image recognition, light barrier, proximity sensors, weight sensors, mechanical buttons, push buttons. For this purpose, the protective elements to be detected are equipped with the information carriers belonging to the corresponding technology. One means of detection can be provided separately at each X-position or a selection thereof. Alternatively or in addition, a means of detection can also monitor several positions together, for example as a camera or RFID antenna with a greater reading range. The evaluation of the characteristic data recorded by the detection means is expediently carried out via a control system, which can also be designed to control further components of an X-ray machine.

An advantageous embodiment of the invention provides that the retaining sections of the holder are each formed by an L-shaped profile which extends in the longitudinal direction X. One leg of the L-profile can serve for the preferably detachable fastening of the holding section to the X-ray machine, while the other leg has the receiving means for connection to a protective element. This leg, which preferably extends in the vertical direction Z, can for example be designed as a perforated strip, whereby the holes lying one behind the other in the longitudinal direction X form receiving means through which a connecting section, designed as a pin, of a protective element to be inserted can be inserted.

Alternatively, two holding sections of the holder according to some embodiments can also be opposite legs of a flat, preferably right-angled and upside-down U-profile. The two legs can extend in the vertical direction Z, as in the case of the aforementioned L-sections, and can be designed as a perforated strip, toothed rail, etc. The two legs can also be connected to each other in the transverse direction. The flat apex of the U-profile connecting the two legs in transverse direction Y can at the same time delimit a part of the X-ray inspection space. It can also have at least one slot, preferably running in transverse direction Y, through which an X-ray beam or X-ray fan can be directed. The holding sections can be designed as a bent sheet metal part.

Depending on the length of the products to be inspected, it may be necessary to extend the X-ray inspection space in the conveying direction X. Accordingly, the protective elements at least partially delimiting the inspection space in the direction of conveyance must also be arranged at a greater distance from one another. For this purpose, the holder according to some embodiments is preferably telescopically extendable. For example, several of the aforementioned L- or U-profiles can be designed to lie one inside the other and to be displaceable relative to one another in the longitudinal direction. The length of the holder can be changed manually or automatically via suitable drives in some embodiments. The length adjustment may also be carried out automatically according to the specification of a product type to be processed or a product group to be processed or a corresponding identification. Protective elements that have already been inserted into the holder can then be automatically moved into an X-position assigned to the product so that the inspection area is automatically adjusted to the correct longitudinal dimensions.

Depending on the product type or product group, different configurations of the X-ray unit, in particular regarding certain length settings, X-positions, or protective elements to be used in each case, can already be checked and approved with regard to their radiation safety, e.g., by a radiation protection officer, before delivery of the unit. A separate check for radiation safety in the field is then no longer necessary when changing the configuration.

It is expedient that certain extension lengths are provided with markings or sensors in order to be able to easily set the required length and/or the desired total length of the holder for certain products. In some embodiments, the apparatus is operable to show on a display or otherwise output color-code or suitably illuminate (see above) the X-position up to which a first holding section is to be displaced relative to a second holding section element that can be moved telescopically in the longitudinal direction X in order to form the desired total length for a specific type of product to be processed.

Instead of a telescopic extension, the holder can also be designed for modular extension. For example, several of the aforementioned L- or U-profiles could be plugged into each other as modules in longitudinal direction X, whereby different lengths of the individual modules in their combination can form a multitude of possible total lengths of the holder. The modules can also have electrical interfaces in order to pass on signals from sensors arranged on the modules or control signals for locking mechanisms or illuminants etc. via an adjacent module.

An X-ray machine in some embodiments includes a holder described above and at least one radiation-absorbing protective element of the type described above which can be inserted into the holder. Products to be examined can be conveyed along the conveying direction X along a conveying path through an X-ray inspection space. The retaining sections of the holder extend in the X-direction above and/or laterally of the conveying path, and the at least one protective element extends transversely thereto across the conveying path. Compared to the prior art, this X-ray machine offers the advantage that one or more protective elements can be easily arranged for operation at different selectable or predefined X-positions.

Preferably, the X-ray machine comprises a control unit and display means controllable by the control unit in order to be able to display or guide various process steps. The control unit is designed to display identification features of at least one protective element to be inserted into the holder and/or its intended and/or assumed X-position via the display means. The display means may be a display/operator terminal as the main display of the machine, via which instructions for operating the X-ray machine are issued to an operator. Alternatively or additionally, several ("local") display means may also be provided at or near individual X-positions to indicate the respective X-position (e.g., for inserting or removing a protective element at this position). For example, local lighting means (LED or similar) could be provided on the receiving means for each X-position in question, which can be switched on by the higher-level control unit to indicate the associated X-position. The control unit and a display cooperating therewith are expediently designed to display instructions for the insertion or removal of a protective element also by means of perspective graphics, from which the relevant X-position and/or the shape and/or position of a protective element relative to other components of the X-ray machine is spatially visible.

Acoustic indicators (horn, buzzer, voice output, etc.) may also be included, for example, to output the requirement to remove or insert a protective element or information on the X-position or the protective element concerned.

Identifiers for specific protective elements to be used may include a number, coding, coloring, symbol, electronically readable indicia, or other information that enables or facilitates an operator's selection or assignment of a specific protective element for a specific product to be processed and/or a specific associated X-position to be used as an operating position for the protective element.

For example, the control system could execute a procedure in which a number or other coding of a protective element to be used for this type is output after selection of a specific product type to be processed. In addition or alternatively, the X-position at which the protective element is to be inserted can also be output via a display and, if required, the respective X-position can also be highlighted by local display means (e.g. LED). In the same way, a protective element to be removed can be named on the display and/or the X-position at which the protective element is to be removed can be indicated.

The control unit is also designed to output signals concerning certain X-positions and/or protective elements to be inserted or inserted to other data processing devices via analogue or digital signal interfaces.

Preferably, the X-ray inspection system according to some embodiments comprises detectors in order to be able to automatically detect the occupancy of certain X-positions by protective elements and/or identification features or codes of these protective elements. This makes it possible to check the correct arrangement of protective elements according to position (X-position) and/or type (e.g., for a specific product) automatically or with the involvement of an operator and to initiate or interrupt certain process sequences. The detectors enable a particularly simple automatic verification (checking of the correct setting) of the device, especially of the protective elements used and their X-position. In addition to the protective elements used and their X-position, the setting data can also include information about their service life to date, the service life still to be expected, the duration of use still admissible, etc.

The settings can be saved and archived locally or on a higher level. The settings can also be assigned to the products inspected. For this purpose, the products in question could be provided with a data carrier or a label to store or mark the settings used for this product (identification of the protective elements used, their respective X-position, time of production, etc.) on the product itself.

For example, the control unit could receive a signal from a higher-level system control for a product change from the previous product $F_1$ to a new product $F_2$, for which the type or position of the protective elements used so far would have to be changed. The protective elements used for the previous product $F_1$ in the device, or the X-positions occupied by them can then be shown via a display or local display means at the respective X-positions in connection with the request to remove them. Via detectors at the corresponding X-positions, the control unit can then determine whether the protective elements used there have also been removed correctly and, if necessary, issue an error message and/or correction instructions.

From a data memory, which can be part of the control unit, an assignment of the product $F_2$ to the protective elements to be used for it or their coordination as well as the associated X-position or X-positions can also be determined automatically. The protective elements to be used for the new product $F_2$ can then be displayed according to type and X-position in the manner described above. Suitable detectors can detect whether a protective element has been inserted in the correct X-position. Suitable detectors could further read a code applied to the then inserted protective element after insertion to verify the correct selection of the protective element and its X-position for insertion.

If, for example, the protective element has been correctly selected but inserted at the wrong X-position, the control unit can output a correction instruction via the detection of the incorrectly used X-position, which can include the indication or display of the correct X-position or also the number of receiving means by which the incorrectly inserted protective element would have to be moved in or against the conveying direction X in order to reach the correct position. This can be particularly helpful if a protective element has to be inserted under difficult lighting conditions or into a holder that is difficult to access. For example, an automatic information message, such as "Move the protective element three holes to the left" (whereby "holes" means individual receiving means of the holder lying one behind the other in the X direction), which can be output on the display or acoustically or by local illuminants in the vicinity of the holder, facilitates correct assembly or disassembly.

If the detectors detect that an incorrect protective element has been inserted, corresponding correction instructions can also be issued via the display means described above. The operation of the system could be automatically interrupted until the correct arrangement of the correct protective elements is automatically detected and checked and/or confirmed by an operator.

The previously described features and properties of the holding device according to the invention can also be transferred or used without difficulty for a belt body which is designed for conveying the products and has such a holding device. Instead of receiving one or more protective elements, the holder arranged on the belt body is then designed for arranging other components important for conveying the product at certain X-positions along the conveying direction X.

A belt body with a holder of the type described above therefore has at least one holding section with receiving means in the same way, analogous to and the above description. On the other hand, the protective elements to be arranged in the holder are intended for the arrangement of components relevant to product conveyance (hereinafter: conveying components), which in particular include: Collecting containers, sorting means, labelling means, separating means, as well as light barriers and other sensors for detecting products on the belt body or their product characteristics. Such conveyor components must be arranged at different X-positions along the conveyor direction on the belt body, depending on the product type, in order to fulfil certain tasks for the conveyor process.

For example, certain products may be moved laterally (in transverse direction Y) out of the conveying path by means of suitable rejection means in order to sort them out of the product sequence and to direct them, for example, into a collecting container arranged laterally next to the belt body. For this purpose, the product could first be irradiated by means of X-rays in order to determine the further conveying or rejection of the product depending on the evaluation of the irradiation.

The separation of rejected products could be carried out by suitable separation means (ejectors, pushers, blowers, swivelling guide plates, etc.), e.g., directly downstream of the X-ray beam, whereby the separation means and any associated collecting containers could be arranged, for example, depending on the respective product length at specific X-positions which vary according to the product type. The receiving means of the holder, as already comprehensively presented above for the protective elements, offer the possibility of arranging or fastening such conveyor components in the same way and with the same functionalities also on the belt body. Analogous to the protective elements, the conveyor components have connecting sections for this purpose, which cooperate with the receiving means of the holder. All the functions and device features described above for the holder (in particular detection and specification of an X-position to be selected or occupied by means of a display and/or other display means, coding and detection of coding, fastening of the protective elements to the holder, etc.) apply equally to the conveyor components cooperating with the holder of the belt body instead of to the protective elements cooperating with the holder.

These and other advantages and features of the invention will be apparent from the following description of representative embodiments, considered along with the accompanying drawings.

DESCRIPTION OF REPRESENTATIVE EMBODIMENTS

Figure 1:
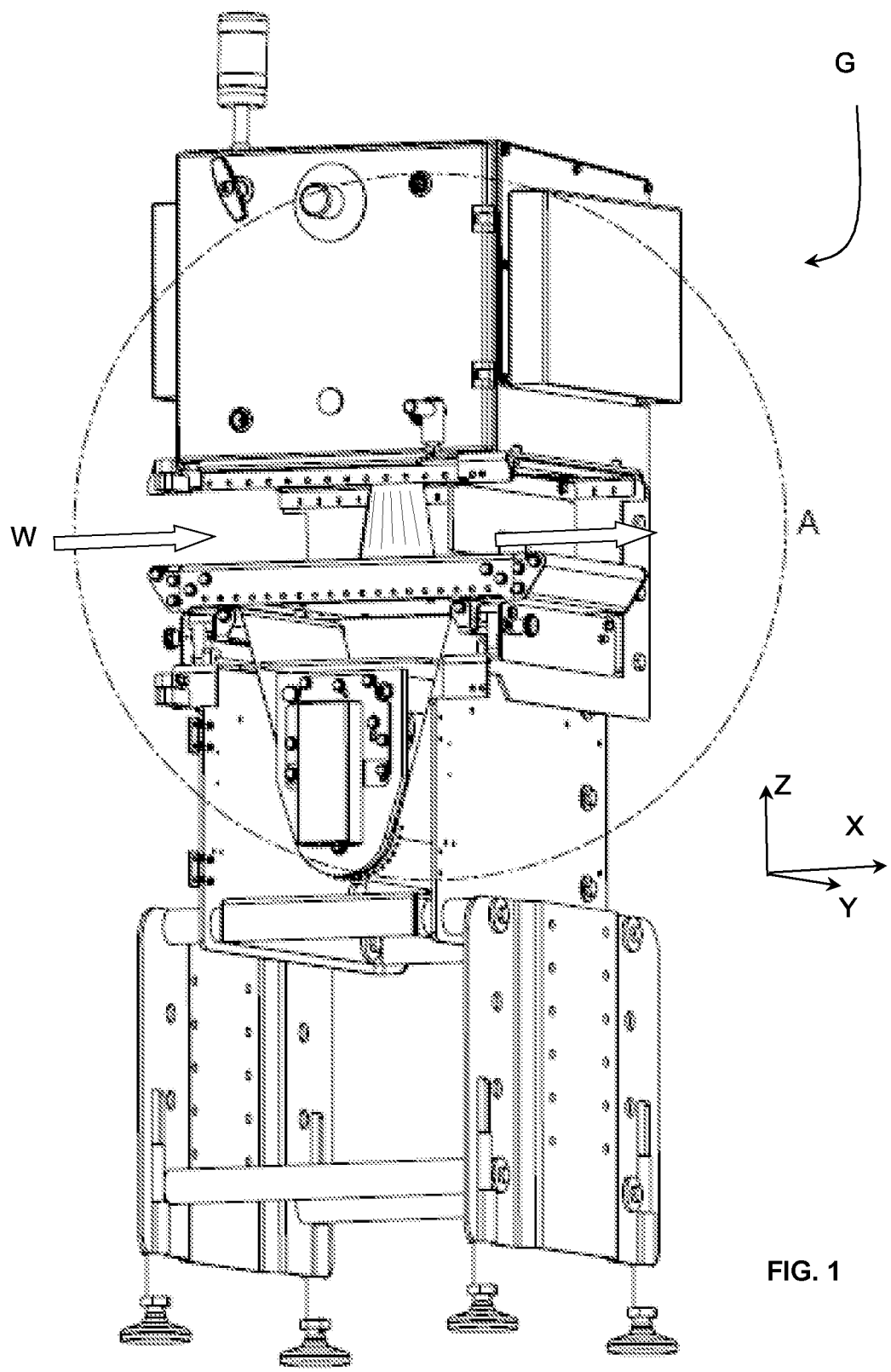
FIG. 1 shows a perspective view of a simplified representation of an X-ray machine according to some embodiments.

FIG. 1 shows a simplified perspective view of an X-ray machine G. The device G can be arranged along a production line in order to convey the products for X-ray inspection along a conveying path W through the device G. In the case shown, the conveying path runs in a horizontal conveying direction X. The transverse direction Y runs transversely to the conveying direction, and a vertical direction Z is to run orthogonally to the two directions X, Y. The essential elements of the X-ray machine or the holder according to the invention are located within the dotted circle "A," the contents of which can be seen enlarged in FIG. 2.

In the center of the X-ray unit G, an X-ray inspection space R is formed, in which products not shown in more detail can be irradiated with X-rays. For this purpose, an X-ray fan V, which lies in a Y-Z plane, is generated by an X-ray source which is concealed in FIG. 2 (above the X-ray inspection area R). The products are moved along the conveyor path W or in the direction of conveyance X through the fan V by means of a belt body H and then leave the X-ray unit G again. Camera means, not shown in more detail, are arranged below or inside the belt body for recording the X-rays altered by the irradiated product.

Figure 2:
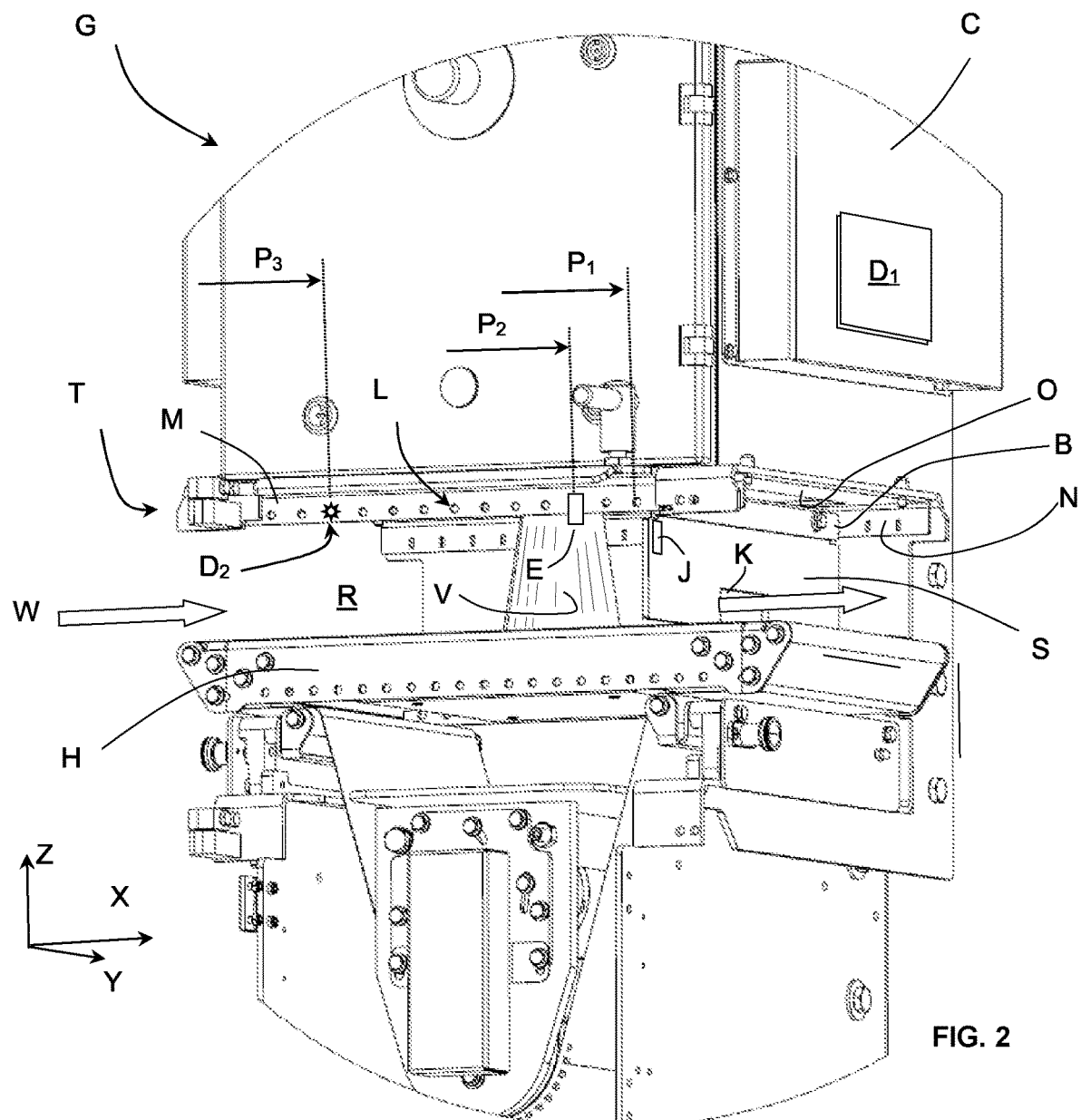
FIG. 2 shows the detailed view according to circle "A" of FIG. 1.

The X-ray inspection area R, which is only indicated in FIG. 2, must be enclosed on all sides during operation in order to prevent harmful X-ray radiation from escaping into the environment. To this end, covers (tunnel walls) are provided at the side of the conveyor path W, which have been omitted in FIG. 2 for the sake of clarity. The belt body H largely closes off the inspection area R at the bottom, while a cover above the conveyor path W, which cannot be seen in detail, forms the upper radiation protection. A protective element S is to be provided in the direction of conveyance X and at the entrance and exit of the X-ray inspection chamber, of which only the downstream protective element S can be seen in FIG. 2. In the case shown, the protective element S is essentially formed by a rigid rectangular plate which extends in the Y-Z direction transversely to the conveying path W. The protective element S has a protective coating at the inlet and at the outlet of the X-ray inspection chamber. The lower edge of the protective element S has a central opening K through which the products to be inspected fit.

For the arrangement of one or more protective elements S, a holder T is provided above and laterally next to the conveying path W in transverse direction Y. The holder T comprises two holding sections M, N which run parallel to each other in the X-direction and are each designed as L-shaped longitudinal profiles. An upper, horizontal leg of the L-profile is mounted on an upper part of the X-ray unit G. The other leg of the L-profile projects down a little in the direction of the belt body H, against the vertical direction Z. In this version, the two L-sections form a downwardly open U-section with a wide apex O between them. The apex O can also be part of the upper boundary of the inspection area R or of the radiation protection there.

In the X-direction, receiving means L ("receiving means," "receiving structure") are provided at regular intervals in this profile leg, which are formed here by simple bores or holes. Each receiving means L occupies a specific X-position and thereby defines a specific operating position possible for a protective element S, whereby the X-positions $P_1$, $P_2$, $P_3$ . . . shown in FIG. 2 are only to be understood as examples and not as exclusive. A receiving means L of one holding section M is opposite a corresponding receiving means L of the other holding section N in transverse direction Y at the same X-position. The two retaining sections M, N are spaced apart in transverse direction Y in such a way that a protective element S, shown in more detail in FIG. 3 and FIG. 4, can be inserted between them at a substantially arbitrary X-position P defined in each case by receiving means L.

Figure 3:
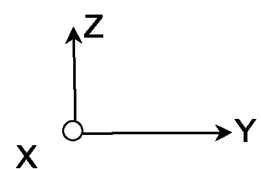
FIG. 3 shows a front view of a protective element.

FIG. 3 shows a protective element S with a lower central opening K, as it is similarly shown in FIG. 2 in an inserted form. The protective element S has an essentially rectangular shape with a width that corresponds approximately to the clear distance between the respective suspended L-legs of the two retaining sections M, N in FIG. 2. Connecting sections A, B in the form of pins are formed at the upper two corners of the protective element S. These are designed to engage in the receiving means L of the retaining sections M, N, which are in the form of holes (the connecting sections A, B may be elastic or spring pre-loaded in the transverse direction Y in order to be inserted by temporary deformation into two holes of the retainer T opposite each other in the transverse direction Y).

Figure 4:
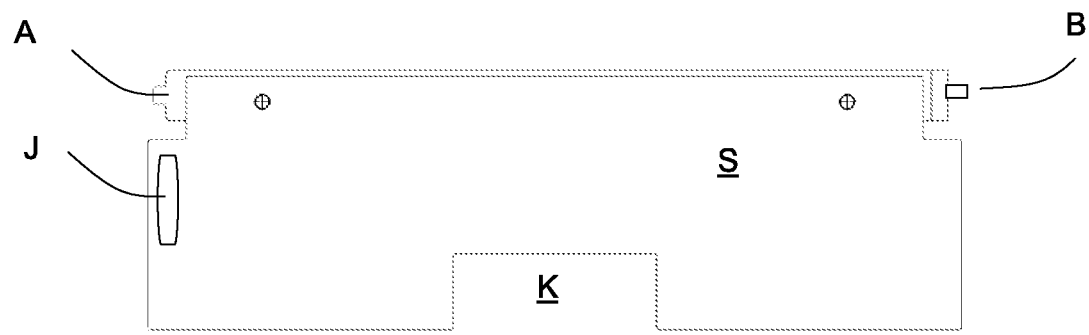
FIG. 4 shows a front view of another type of protective element.
Figure 4:
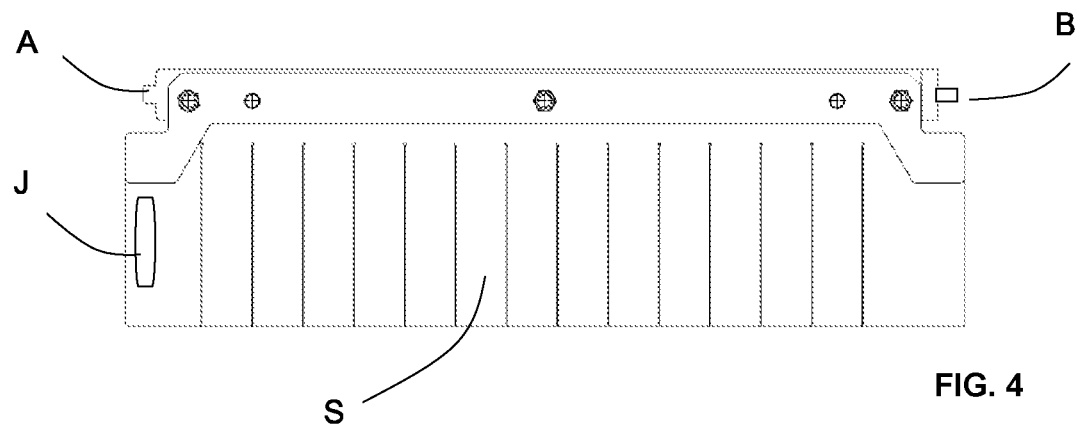

The protective element S according to FIG. 4 has similar dimensions and has connecting sections A, B that function analogously. However, this protective element is not designed as a panel, but as a curtain with individual vertically hanging, flexible slats that are partially separated from each other in the transverse direction. The slats are so flexible that a product being conveyed through the curtain can temporarily push the slats to the side or in the direction of movement, whereby they then return to their position shown in FIG. 4 and form an essentially closed radiation shield.

Both protective elements S carry simplified coding means J on the edge, which contain information about certain properties of the protective element (type, protective effect, product suitability, dimensions, date of manufacture or last use or functional test, etc.). The coding means are designed to permanently or temporarily store data and to make it available for reading, for example via RFID or barcode technology.

The X-ray machine G according to FIG. 2 is equipped with several detectors E at different X-positions, whereby only one detector is shown in FIG. 2 as an example at the X-position $P_2$. The detector E is designed to detect whether or not a protective element S is inserted at the X-position $P_2$. The detector E or another detector, not shown here, can also be designed to read out the coding J of a protective element S inserted at a specific X-position. The data detected by the detector E are fed to a control unit C, which is designed to control various functions of the X-ray machine G and to output information by means of the display means D. The data fed to the control unit C can be used, for example, to determine whether or not the appropriate protective element S has been inserted at the correct X-position for a particular product processing.

The display means $D_1$ is a "global" display means in the form of a display in order to be able to output information of any kind or (e.g., in the case of a touch screen) also to be able to enter it. In particular, the display $D_1$ is used to give instructions to an operator, e.g., to name a certain protective element S or an X-position applicable to this protective element. Furthermore, the X-ray machine also comprises "local" display means or indicator $D_2$ at individual X-positions, only one of which is shown in the form of an LED at the X-position $P_3$. The local display means or indicators are each arranged in the vicinity of a specific X-position in order to indicate to an operator precisely this X-position during specific process sequences.

The X-ray unit shown in FIG. 2 is designed, by means of the associated control unit C, to provide the operator with information about the type and/or the X-position of a protective element S to be inserted into or removed from the holder T, whereby an X-position can be indicated by global or local display means or by acoustic displays (buzzer, warning tones, voice output, etc.). Information about a protective element S can also be output in this way, the information being taken from a memory accessible to the control unit C and/or being determined and output by evaluating the coding J detected by a detector E.

Figure 5:
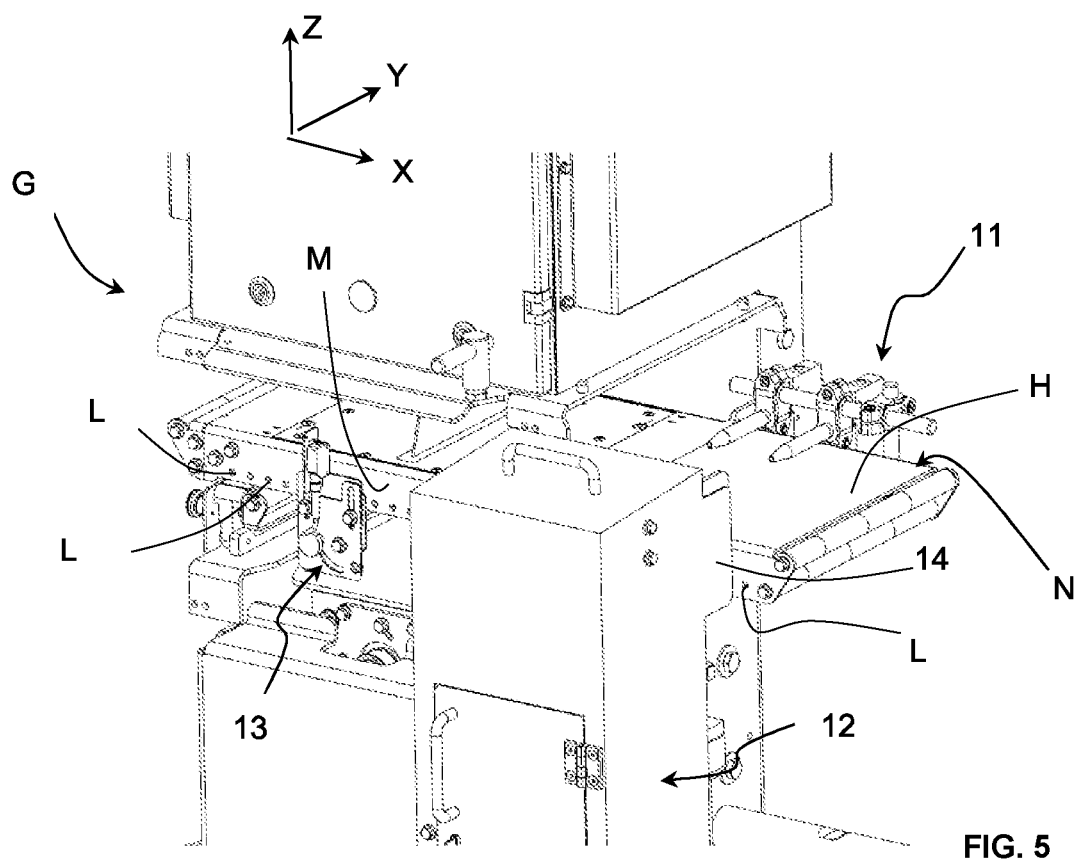
FIG. 5 shows a perspective view of a belt body with some conveyor components arranged thereon.

FIG. 5 shows a simplified illustration of an X-ray unit G in which the belt body H is provided with a holder according to some embodiments. Analogous to the designs in FIGS. 1 and 2, the holder is formed by two holding sections M, N, which are arranged on the belt body H and lie parallel to each other. The holding sections M, N, which in this case are in the form of perforated strips, have holes as receiving means L, as in FIGS. 1 and 2, some of which are designated.

The receiving means L are used to attach various conveyor components to the holder H at specific X-positions along the holder. For example, a light barrier 13 is attached to the holding section M, which uses a light emitter directed in transverse direction Y to detect products conveyed by the belt conveyor. The holding section N carries a sorting device 11 which can apply an air blast to a product to be sorted out transversely to the conveying direction X by means of two air nozzles. This feeds the product to a collecting container 12 arranged opposite the sorting device 11 in the transverse direction Y at the holding section M. The collecting container 12 is fastened to the holding section M by means of fastening cheeks 14 with suitable connecting sections. The X-position of the light barrier 13, the sorting device 11 and the collecting container 12, as well as further conveying components not shown in more detail here, can be selected as desired and suitable via the receiving means L used for the respective fastening.

Figure 6:
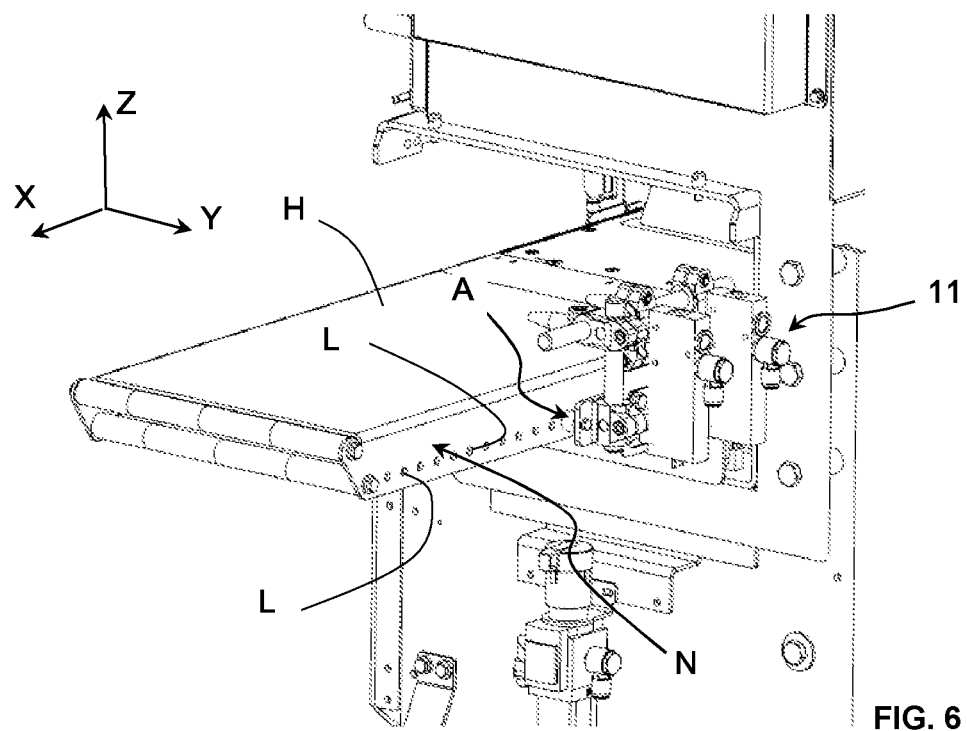
FIG. 6 shows the arrangement according to FIG. 5 but in a different perspective view.

FIG. 6 shows the arrangement according to FIG. 5 partially cut out in a different perspective view. The collecting container 12 and the light barrier 13 have been omitted in this view. It can be clearly seen that the sorting device 11 is connected to the holding section N via connecting sections A and several of the receiving means L, which are in the form of holes. The X-position for fastening the sorting device can be expediently selected in coordination with a previous check (for example X-ray transmission) in such a way that, at a known conveying speed, the product does not reach the sorting device before the evaluation of the X-ray transmission is completed and, if necessary, the sorting device is signalled to reject the product.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCES

A Connecting section
B Connecting section
C Control unit
$D_1$ Display
$D_2$ Indicator (LED)
E Detector
G X-ray inspection machine (X-ray machine)
H Belt body
J Identifier/Coding
K Outlet opening
L Receiving structure
M Holding section
N Holding section
O Apex of the U-shaped bracket
$P_1$, $P_2$, $P_3$ X-positions
R X-ray inspection space
S Protective element
T Holder
V X-ray fan
W Conveying path
X Conveying direction
Y Transverse direction
Z Vertical direction
11 Sorting device
12 Collecting container
13 Light barrier
14 Fastening cheek

The invention claimed is:

1. An X-ray inspection apparatus comprising:
   (a) an X-ray inspection space through which a conveying path leads in a longitudinal direction; and
   (b) a holder adapted for holding a protective element in any one of multiple operating positions in which the protective element at least partially delimits the X-ray inspection space and is operable to prevent at least some X-rays from escaping from the X-ray inspection space, the holder including,
      (i) at least two holding sections spaced apart in a transverse direction extending transverse to the longitudinal direction, and (ii) a plurality of receiving structures formed along at least one of the holding sections and being spaced apart from one another in the longitudinal direction, wherein each receiving structure is adapted to receive a connecting section of the protective element to detachably connect the protective element to the holder in a respective one of the operating positions.

2. The X-ray inspection apparatus of claim 1 wherein at least one of the holding sections comprises a material section extending in the longitudinal direction with the plurality of receiving structures formed therein as holes or other recesses.

3. The X-ray inspection apparatus of claim 1 wherein the receiving structures are each adapted to be connected to or disconnected from the connecting section of the protective element without tools.

4. The X-ray inspection apparatus of claim 1 further comprising a coding feature associated with a respective one of the receiving structures so as to distinguish that respective receiving structure.

5. The X-ray inspection apparatus of claim 4 wherein the coding feature includes a mechanical engagement profile of the respective receiving structure adapted to be exclusively connectable to a protective element connecting section having a matching mechanical engagement profile.

6. The X-ray inspection apparatus of claim 4 wherein the coding feature includes a magnetic engagement profile of the respective receiving structure adapted to be exclusively connectable to a protective element connecting section having an attracting magnetic engagement profile.

7. The X-ray inspection apparatus of claim 4 wherein the coding feature includes an optically detectable feature proximate to the respective receiving structure, the optically detectable feature comprising a color, letter, number, or symbol.

8. The X-ray inspection apparatus of claim 4 wherein the coding feature includes an illumination element proximate to the respective receiving structure.

9. The X-ray inspection apparatus of claim 1 further comprising a detector arrangement adapted to detect a characteristic of the protective element inserted the holder, the characteristic comprising a protective element type or longitudinal position of the protective element.

10. The X-ray inspection apparatus of claim 1 further comprising a detector arrangement adapted to read a coding feature the protective element inserted into the holder.

11. The X-ray inspection apparatus of claim 1 wherein each holding section has an L-shape in plane orthogonal to the longitudinal direction.

12. The X-ray inspection apparatus of claim 1 wherein the holder has a downwardly open, U-shape defining two legs that at least partially form two of the at least two holding sections and defining an apex connecting the two legs, the apex delimiting an upper side of the X-ray inspection space.

13. The X-ray inspection apparatus of claim 1 wherein the holder is adapted to be telescopically or modularly extended in the longitudinal direction in order to increase or change the number or position of receiving structures.

14. The X-ray inspection apparatus of claim 1 wherein:
(a) the protective element comprises an at least partially flexible radiation absorptive curtain or a substantially rigid radiation absorptive plate;
(b) products for inspection are conveyed in the longitudinal direction along the conveying path; and
(c) the at least two holding sections extend in the longitudinal direction and are arranged above the conveying path so that the protective element held in one of the multiple operating positions extends over the conveying path in the transverse direction and extends down from the holder in an elevation direction.

15. The X-ray inspection apparatus of claim 1 further comprising:
(a) a display device; and
(b) a control unit adapted to control the display device to display (i) identification features of the protective element, or (ii) an intended or actual position of the protective element on the holder.

16. The X-ray inspection apparatus of claim 1 further comprising a control unit adapted to output signals representing (i) identification features of the protective element, or (ii) an intended or actual position of the protective element on the holder.

17. The X-ray inspection apparatus of claim 15 further comprising detectors for detecting one or more of (i) a position of the protective element inserted in the holder, and (ii) identifying features of the protective element inserted in the holder.

18. The X-ray inspection apparatus of claim 1 further comprising the protective element, and wherein the protective element is formed at least partially of radiation-absorbing material and includes at least one connecting section adapted for connecting with one of the receiving structures to attach the protective element to the holder.

19. A method for removing or inserting a protective element in the X-ray inspection apparatus of claim 1, the method comprising:
with an indicator of the X-ray inspection apparatus, indicating at least one of: an intended operating position for a protective element on a holder, a currently occupied operating position for a protective element on the holder, at least one identification feature of a protective element to be removed from the holder, and at least one identification feature of a protective element to be inserted into the holder.

20. The method of claim 19 further comprising:
identifying incorrect removal or insertion of the protective element from the holder by detecting at least one of: an identification feature of the protective element removed from the holder, the identification feature of the protective element inserted in the holder, an operating position of the protective element removed from the holder, and an operating position of the protective element inserted in the holder; and
in response, with the indicator of the X-ray inspection apparatus, providing at least one of: an indication that the insertion or removal was incorrect, an indication of a correct operating position intended for insertion or removal.

* * * * *